(12) United States Patent
Otaki et al.

(10) Patent No.: US 11,979,057 B2
(45) Date of Patent: May 7, 2024

(54) ROTOR FOR EDDY CURRENT DECELERATION DEVICE

(71) Applicant: NIPPON STEEL CORPORATION, Tokyo (JP)

(72) Inventors: Nao Otaki, Tokyo (JP); Hirokazu Okada, Tokyo (JP); Yasutaka Noguchi, Tokyo (JP); Kenji Imanishi, Tokyo (JP); Masahiro Tasaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 430 days.

(21) Appl. No.: 17/594,198

(22) PCT Filed: Apr. 21, 2020

(86) PCT No.: PCT/JP2020/017151
§ 371 (c)(1),
(2) Date: Oct. 6, 2021

(87) PCT Pub. No.: WO2020/218276
PCT Pub. Date: Oct. 29, 2020

(65) Prior Publication Data
US 2022/0216741 A1 Jul. 7, 2022

(30) Foreign Application Priority Data
Apr. 24, 2019 (JP) ................. 2019-083029

(51) Int. Cl.
*H02K 1/02* (2006.01)
*C22C 38/00* (2006.01)
(Continued)

(52) U.S. Cl.
CPC ............. *H02K 1/02* (2013.01); *C22C 38/001* (2013.01); *C22C 38/002* (2013.01); *C22C 38/02* (2013.01);
(Continued)

(58) Field of Classification Search
CPC ........ H02K 1/02; H02K 49/043; H02K 49/10; C22C 38/001; C22C 38/002; C22C 38/02;
(Continued)

(56) References Cited

U.S. PATENT DOCUMENTS

2016/0145704 A1\* 5/2016 Kawasaki ................ C21D 7/13
148/330

FOREIGN PATENT DOCUMENTS

| CN | 109321730 A | 2/2019 | |
|---|---|---|---|
| JP | 849041 A | 2/1996 | |
| JP | 6187729 B1 \* | 8/2017 | ........... B32B 15/013 |

OTHER PUBLICATIONS

English translation of JP-6187729-B1 (Year: 2017).\*

\* cited by examiner

*Primary Examiner* — Tulsidas C Patel
*Assistant Examiner* — Joshua Kiel M Rodriguez
(74) *Attorney, Agent, or Firm* — Greer Burns & Crain Ltd.

(57) ABSTRACT

A cylindrical part of a rotor for an eddy current deceleration device of the present embodiment has a chemical composition consisting of, by mass %, C: 0.05 to 0.15%, Si: 0.10 to 0.40%, Mn: 0.50 to 1.00%, P: 0.030% or less, S: 0.030% or less, Mo: 0.20 to 1.00%, Nb: 0.020 to 0.060%, V: 0.040 to 0.080%, sol. Al: 0.030 to 0.100%, B: 0.0005 to 0.0050%, N: 0.003 to 0.010%, Cu: 0 to 0.20%, Ni: 0 to 0.20%, Cr: 0 to 0.10%, and the balance: Fe and impurities, and in which the total area fraction of martensite and bainite in a microstructure is more than 95.0%, and the number density of carbides having an equivalent circular diameter of 100 to 500 nm is 0.35 to 0.75 particles/$\mu m^2$.

2 Claims, 2 Drawing Sheets (51) Int. Cl.
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/54* (2006.01)
*H02K 49/04* (2006.01)

(52) U.S. Cl.
CPC .............. *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/54* (2013.01); *H02K 49/043* (2013.01)

(58) Field of Classification Search
CPC ......... C22C 38/04; C22C 38/06; C22C 38/42; C22C 38/44; C22C 38/46; C22C 38/48; C22C 38/54; C22C 38/08; C22C 38/12; C22C 38/16; C22C 38/22; C22C 38/24; C22C 38/26; C22C 38/32; C21D 1/18; C21D 1/26; C21D 6/02; C21D 9/0068; C21D 9/46; C21D 2211/002; C21D 2211/004; C21D 2211/008; Y02T 10/64
See application file for complete search history.

ROTOR FOR EDDY CURRENT DECELERATION DEVICE

TECHNICAL FIELD

The present disclosure relates to a rotor, and more particularly to a rotor for an eddy current deceleration device, that is used in an eddy current deceleration device (retarder).

BACKGROUND ART

Large-sized motor vehicles such as buses and trucks are equipped with braking devices such as foot brakes and exhaust brakes. Some large-sized motor vehicles that have emerged recently are also equipped with an eddy current deceleration device. An eddy current deceleration device is also called a "retarder". For example, an eddy current deceleration device is actuated in a case where a large-sized motor vehicle is traveling on a downslope which has a long steep incline or the like and it is difficult to reduce the traveling speed of the large-sized motor vehicle even when the engine brake and the exhaust brake are used in combination. By actuating the eddy current deceleration device, the braking force can be further increased and the traveling speed of the large-sized motor vehicle can be effectively reduced.

The types of eddy current deceleration devices that are available include a type that uses electromagnets and a type that uses permanent magnets. An eddy current deceleration device that uses permanent magnets is equipped with a rotor, and a stator which is housed inside the rotor. The rotor is equipped with, for example, a cylindrical part (drum), an annular wheel part for fixing the rotor to a propeller shaft, and a plurality of arm parts which connect the cylindrical part and the wheel part. The stator is equipped with a cylindrical body, a plurality of permanent magnets of two kinds that have different polarities, and a plurality of pole pieces. The plurality of permanent magnets that have different polarities are alternately arranged in the circumferential direction on the outer peripheral surface of the cylindrical body. The pole pieces are arranged between the inner peripheral surface of the cylindrical part of the rotor and the permanent magnets. Among the components of the stator, the cylindrical body to which the plurality of permanent magnets are attached is capable of rotating around the axis of the cylindrical body separately and independently from the plurality of pole pieces.

During braking, that is, when the eddy current deceleration device is actuated, the magnetic flux of the permanent magnets of the stator reaches the rotor through the pole pieces, and a magnetic circuit is formed between the permanent magnets and the cylindrical part of the rotor. At this time, an eddy current is generated in the cylindrical part of the rotor. A Lorentz force is generated accompanying generation of the eddy current. The Lorentz force acts as a braking torque, and imparts a braking force to the large-sized motor vehicle. On the other hand, during non-braking operation, that is, in the case of deactivating the eddy current deceleration device, the relative position of the permanent magnets with respect to the pole pieces is shifted so that the magnetic flux of the permanent magnets does not reach the rotor. In this case, a magnetic circuit is not formed between the permanent magnets and the cylindrical part of the rotor. Therefore, an eddy current is not generated in the cylindrical part of the rotor, and a braking force is also not generated. By the above operations, the eddy current deceleration device switches between performing a braking operation and non-braking operation (deactivating).

In this connection, the braking force depends on the eddy current amount generated in the cylindrical part of the rotor during braking. Therefore, it is preferable that the eddy current amount generated in the cylindrical part of the rotor during braking is large. In order to increase the eddy current amount generated during braking, it is preferable that the electrical resistance of the cylindrical part of the rotor is lower.

In addition, during braking, the rotor is heated by Joule heating that occurs together with the eddy current. On the other hand, during non-braking operation of the eddy current deceleration device, the rotor is rapidly cooled (air-cooled) by a plurality of cooling fins formed on the outer peripheral surface of the cylindrical part. In other words, by repetition of braking and non-braking, a heat cycle is applied to the rotor. Therefore, a rotor for an eddy current deceleration device is required to have not only low electrical resistance, but also high high-temperature strength.

Japanese Patent Application Publication No. 8-49041 (Patent Literature 1) discloses a technique for obtaining high high-temperature strength in a rotor for an eddy current deceleration device while reducing the electrical resistance.

A rotor material for an eddy current deceleration device disclosed in Patent Literature 1 consists of, by mass %, C: 0.05 to 0.15%, Si: 0.10 to 0.40%, Mn: 0.5 to 1.0%, P: 0.05% or less, Ni: 0.50% or less, Mo: 0.2 to 1.0%, Nb: 0.01 to 0.03%, V: 0.03 to 0.07%, B: 0.0005 to 0.003%, sol. Al: 0.02 to 0.09%, and N: 0.01% or less, with the balance being substantially Fe. According to Patent Literature 1, the electrical resistance of the rotor material is reduced by reducing the contents of P, Ni, and Mn that are elements which increase electrical resistance. In addition, the high-temperature strength of the rotor material is increased by containing B.

CITATION LIST

Patent Literature

[Patent Literature 1] Japanese Patent Application Publication No. 8-49041

SUMMARY OF INVENTION

Technical Problem

In this connection, as mentioned above, a heat cycle is applied to the rotor due to repetition of braking and non-braking operations of the eddy current deceleration device. When the cumulative operating time of the eddy current deceleration device becomes long, the number of heat cycles applied to the rotor becomes a large number, and the cumulative time for which the rotor is held at a high temperature also becomes long. Consequently, in some cases the high-temperature strength of the rotor decreases as the cumulative operating time of the eddy current deceleration device increases. It is preferable that the high-temperature strength of the rotor can be maintained as much as possible, even when the cumulative operating time of the eddy current deceleration device becomes long.

An objective of the present disclosure is to provide a rotor for an eddy current deceleration device which has low electrical resistance and high high-temperature strength, and which can also suppress a decrease in high-temperature strength associated with the cumulative operating time of an eddy current deceleration device.

Solution to Problem

A rotor for an eddy current deceleration device according to the present disclosure includes:
a cylindrical part,
wherein a chemical composition of the cylindrical part consists of, by mass %,
C: 0.05 to 0.15%,
Si: 0.10 to 0.40%,
Mn: 0.50 to 1.00%,
P: 0.030% or less,
S: 0.030% or less,
Mo: 0.20 to 1.00%,
Nb: 0.020 to 0.060%,
V: 0.040 to 0.080%,
sol. Al: 0.030 to 0.100%,
B: 0.0005 to 0.0050%,
N: 0.003 to 0.010%,
Cu: 0 to 0.20%,
Ni: 0 to 0.20%,
Cr: 0 to 0.10%, and
the balance: Fe and impurities,
and wherein:
a total area fraction of martensite and bainite in a microstructure is more than 95.0%, and
a number density of carbides having an equivalent circular diameter of 100 to 500 nm is within a range of 0.35 to 0.75 particles/$\mu m^2$.

Advantageous Effects of Invention

The rotor for an eddy current deceleration device according to the present disclosure has low electrical resistance and high high-temperature strength, and furthermore, can suppress a decrease in high-temperature strength associated with the cumulative operating time of an eddy current deceleration device.

DESCRIPTION OF EMBODIMENT

The present inventors conducted investigations and studies regarding means whereby a rotor for an eddy current deceleration device can have low electrical resistance and high high-temperature strength, and furthermore can suppress a decrease in high-temperature strength associated with the cumulative operating time of the eddy current deceleration device.

The present inventors regarded a steel material having a chemical composition consisting of, by mass %, C: 0.05 to 0.15%, Si: 0.10 to 0.40%, Mn: 0.50 to 1.00%, P: 0.030% or less, S: 0.030% or less, Mo: 0.20 to 1.00%, Nb: 0.020 to 0.060%, V: 0.040 to 0.080%, sol. Al: 0.030 to 0.100%, B: 0.0005 to 0.0050%, N: 0.003 to 0.010%, Cu: 0 to 0.20%, Ni: 0 to 0.20%, Cr: 0 to 0.10%, and the balance: Fe and impurities, and which was subjected to quenching and tempering, as a rotor, and investigated the electrical resistance and also a tensile strength TS0 (MPa) at 650° C. of the steel material. In addition, the present inventors simulated the high-temperature strength in a case where the cumulative operating time of the eddy current deceleration device became long to carry out a high-temperature aging test. In the high-temperature aging test, a steel material having the aforementioned chemical composition was held at 650° C. for 300 hours. After aging the steel material at 650° C. for 300 hours, a tensile strength TS1 (MPa) at 650° C. was determined. The difference between the tensile strength TS0 and the tensile strength TS1 was defined as a tensile strength difference ΔTS (MPa). As a result of this investigation, it was found that with respect to a steel material having the aforementioned chemical composition, in some cases, even though the electrical resistance could be suppressed to a low value, the tensile strength difference ΔTS between the tensile strength TS0 at 650° C. and the tensile strength TS1 after the high-temperature aging test was large, and a decrease in the high-temperature strength associated with cumulative operating time passage was large.

Therefore, the present inventors conducted investigations regarding the mechanism by which the high-temperature strength decreases when the cumulative operating time of an eddy current deceleration device becomes long. In the case of the conventional rotor, quenching and tempering are carried out after hot forging, and the high-temperature strength is increased by the dislocation density introduced by quenching. In this case, in the initial stage of operation of the eddy current deceleration device, high tensile strength can be maintained even at 650° C. because of dislocations. However, as the cumulative operating time of the eddy current deceleration device lengthens, the high temperature holding time of the rotor becomes longer, and the dislocation density in the rotor markedly decreases. Thus, it is considered that in a case where the high-temperature strength of a rotor for an eddy current deceleration device is secured by the dislocation density, the high-temperature strength decreases as the cumulative operating time of the eddy current deceleration device becomes longer.

Therefore, with respect to a rotor composed of a steel material having the aforementioned chemical composition, the present inventors conducted studies regarding suppressing a decrease in the high-temperature strength associated with the cumulative operating time of an eddy current deceleration device by a mechanism that is different from a mechanism which improves the high-temperature strength by utilizing dislocation density.

In the aforementioned chemical composition, Mo carbides ($Mo_2C$), cementite, Nb carbides (NbC), V carbides (VC) and the like are present as carbides that are formed. The finest carbides among these carbides are Nb carbides and V carbides of MX-type precipitates. The average equivalent circular diameter of MX-type precipitates is 50 nm or less. In the present description, Nb carbides and V carbides are referred to as "fine carbides". On the other hand, Mo carbides and cementite are carbides which are larger than Nb carbides and V carbides of MX-type precipitates, and in most cases the equivalent circular diameter of Mo carbides and cementite is 100 nm or more. In the present description, among Mo carbides and cementite, Mo carbides and cementite which have an equivalent circular diameter within a range of 100 to 500 nm are defined as "medium-sized carbides".

Fine carbides and medium-sized carbides increase the high-temperature strength of the rotor by a precipitation strengthening mechanism. Therefore the present inventors considered that if the dislocation density in the rotor is reduced compared to the conventional technique, and the high-temperature strength is secured by precipitation strengthening using fine carbides and medium-sized carbides instead of the dislocation density, a decrease in the high-temperature strength of the rotor that is associated with the cumulative operating time can be suppressed.

Thus, the present inventors conducted studies regarding the high-temperature strength of a rotor in which the number density of fine carbides and medium-sized carbides was increased. However, the results of the studies revealed that in a case where the number density of fine carbides and medium-sized carbides is increased, although the tensile strength TS0 at 650° C. can be increased, in some cases the tensile strength TS1 at 650° C. after a high-temperature aging test is low, and the tensile strength difference ΔTS (=TS0−TS1) markedly decreases.

Therefore, the present inventors investigated the cause of the above results. As a result, the present inventors obtained the following findings. If the number density (particles/µm$^2$) of medium-sized carbides having an equivalent circular diameter of 100 to 500 nm is too small, the tensile strength TS0 at 650° C. will be too low. Therefore, it is necessary for the number density of the medium-sized carbides to be of a certain level. However, when the number density of medium-sized carbides is excessively large, a large number of dislocations will be trapped in medium-sized carbides within the rotor. Therefore, the state within the rotor will be one in which although there are many medium-sized carbides, the dislocation density will also be excessively high. In this case, the high-temperature strength of the rotor is secured by a precipitation strengthening mechanism produced by the fine carbides and medium-sized carbides, and a high dislocation density. Therefore, in a case where the rotor in question is aged at a high temperature for a long time, the dislocations in the rotor will disappear and the high-temperature strength will markedly decrease.

Based on the above findings, the present inventors considered that in order to suppress the occurrence of a decrease in the high-temperature strength after aging for a long time at a high temperature, instead of simply increasing the number density of medium-sized carbides by utilizing precipitation strengthening, there is an appropriate range of the number density of medium-sized carbides which can sufficiently reduce the dislocation density in a rotor while also exerting the effects of a precipitation strengthening mechanism. Therefore, the present inventors conducted studies regarding an appropriate range of the number density of medium-sized carbides with which, with respect to a rotor composed of a steel material having the chemical composition described above, high high-temperature strength is obtained and which can suppress a decrease in the high-temperature strength after aging for a long time at a high temperature. As a result, the present inventors discovered that, in a rotor having the chemical composition described above and in which the total area fraction of martensite and bainite in the microstructure is more than 95.0%, if the number density of carbides having an equivalent circular diameter of 100 to 500 nm (medium-sized carbides) is within a range of 0.35 to 0.75 particles/µm$^2$, low electrical resistance and high high-temperature strength are obtained, and even after the rotor is held for a long time at a high temperature, a decrease in the high-temperature strength can be effectively suppressed.

A rotor for an eddy current deceleration device of the present embodiment that has been completed based on the above findings has the following structures.

[1]

A rotor for an eddy current deceleration device, including:
a cylindrical part,
wherein a chemical composition of the cylindrical part consists of, by mass %,
C: 0.05 to 0.15%,
Si: 0.10 to 0.40%,
Mn: 0.50 to 1.00%,
P: 0.030% or less,
S: 0.030% or less,
Mo: 0.20 to 1.00%,
Nb: 0.020 to 0.060%,
V: 0.040 to 0.080%,
sol. Al: 0.030 to 0.100%,
B: 0.0005 to 0.0050%,
N: 0.003 to 0.010%,
Cu: 0 to 0.20%,
Ni: 0 to 0.20%,
Cr: 0 to 0.10%, and
the balance: Fe and impurities,
and wherein:
a total area fraction of martensite and bainite in a microstructure is more than 95.0%; and
a number density of carbides having an equivalent circular diameter of 100 to 500 nm is within a range of 0.35 to 0.75 particles/µm$^2$.

[2]

The rotor for an eddy current deceleration device according to [1], wherein the chemical composition contains one or more elements selected from a group consisting of:
Cu: 0.01 to 0.20%,
Ni: 0.01 to 0.20%, and
Cr: 0.01 to 0.10%.

Hereunder, the rotor for an eddy current deceleration device of the present embodiment is described in detail.

[Structure of Eddy Current Deceleration Device]

Figure 1:
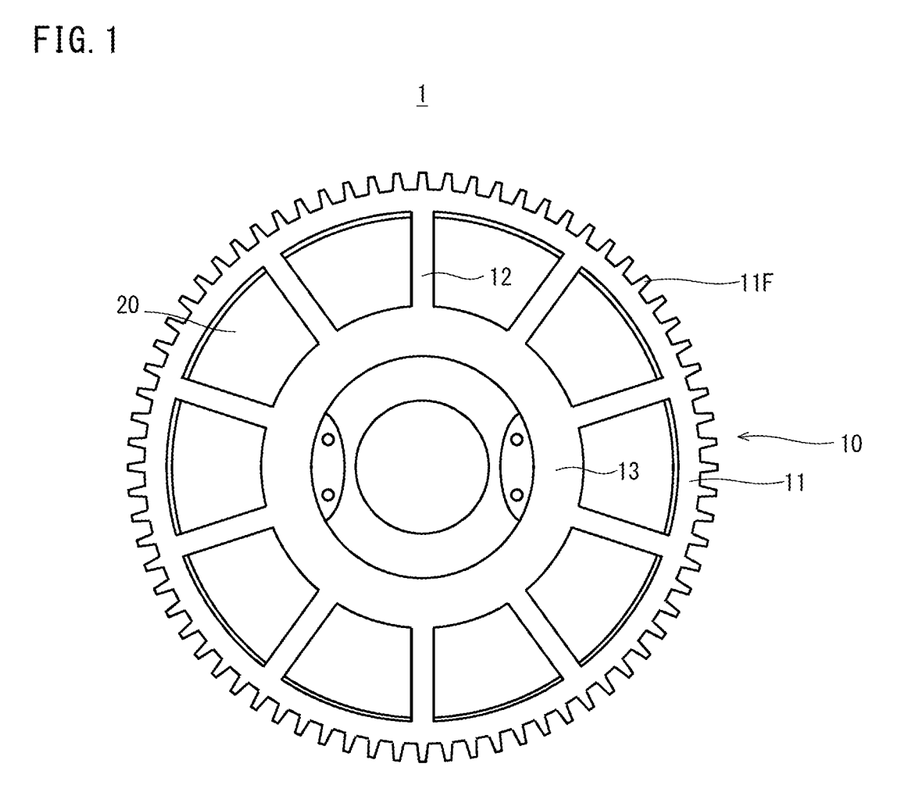
FIG. 1 is a front view of an eddy current deceleration device to which a rotor for an eddy current deceleration device of the present embodiment is applied.

FIG. 1 is a front view of an eddy current deceleration device to which the rotor for an eddy current deceleration device of the present embodiment is applied. Referring to FIG. 1, an eddy current deceleration device 1 includes a rotor 10 and a stator 20.

Figure 2:
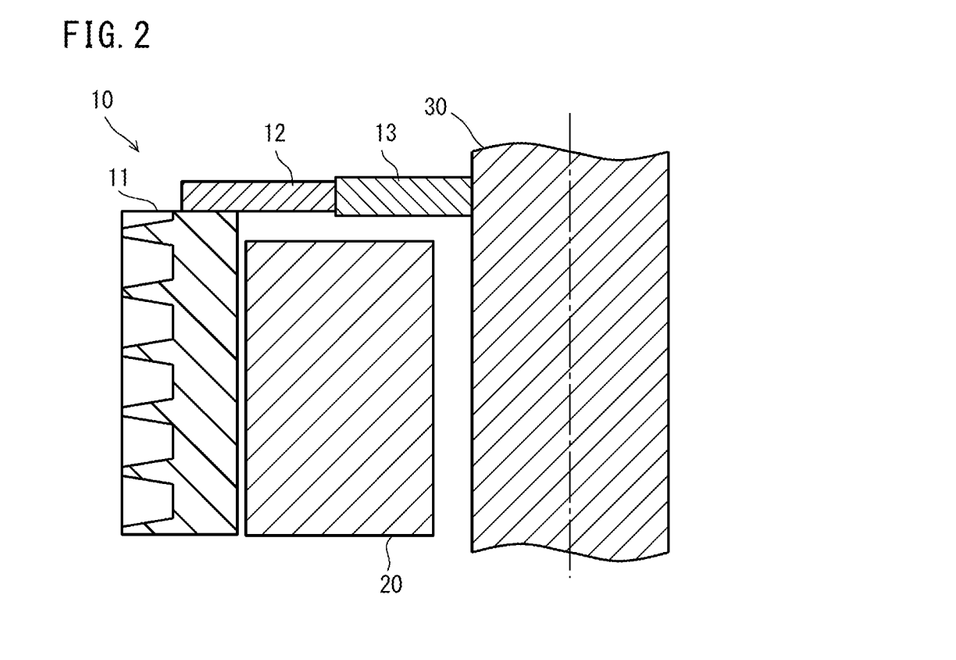
FIG. 2 is a cross-sectional view in an axial direction of a propeller shaft of the eddy current deceleration device in a case where the eddy current deceleration device illustrated in FIG. 1 is fixed to the propeller shaft.

FIG. 2 is a cross-sectional view of the eddy current deceleration device 1 illustrated in FIG. 1 in an axial direction of a propeller shaft 30, in a case where the eddy current deceleration device 1 is fixed to the propeller shaft 30. Referring to FIG. 2, in the present embodiment, the rotor 10 is fixed to the propeller shaft 30. The stator 20 is fixed to an unshown transmission. Referring to FIG. 1 and FIG. 2, the rotor 10 includes a cylindrical part (drum) 11. More specifically, the rotor 10 includes the cylindrical part 11, an arm part 12, and a wheel part 13. The cylindrical part 11 is a cylindrical shape, and has an inner diameter that is greater than the outer diameter of the stator 20. The wheel part 13 is an annular member that has an outer diameter which is smaller than the inner diameter of the cylindrical part 11, and has a through-hole at the center section thereof. A thickness (length in the axial direction of the propeller shaft 30) of the wheel part 13 is thinner than a thickness (length in the axial direction of the propeller shaft 30) of the cylindrical part 11.

The wheel part 13 is fixed to the propeller shaft 30 by inserting the propeller shaft 30 into the through-hole. As illustrated in FIG. 1 and FIG. 2, the arm part 12 connects an end portion of the cylindrical part 11 and the wheel part 13. Note that, a plurality of cooling fins 11F are formed on the outer peripheral surface of the cylindrical part 11. The cylindrical part 11, the arm part 12, and the wheel part 13 may be integrally formed. The cylindrical part 11, the arm part 12, and the wheel part 13 may composed of separate and independent members.

Figure 3:
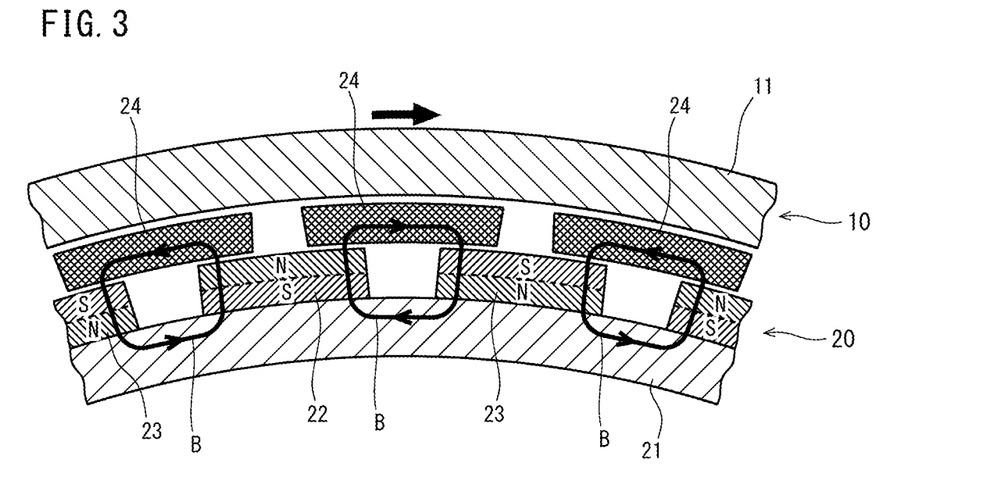
FIG. 3 is a cross-sectional view perpendicular to the axial direction (cross-sectional view in a radial direction) of the eddy current deceleration device during non-braking operation.

FIG. 3 is a cross-sectional view perpendicular to the axial direction (cross-sectional view in a radial direction) of the eddy current deceleration device 1 at a time of non-braking operation. Referring to FIG. 3, the stator 20 includes a magnet holding ring 21, a plurality of permanent magnets 22 and 23, and a plurality of pole pieces 24. The plurality of permanent magnets 22 and permanent magnets 23 are alternately arranged in a circumferential direction on the outer peripheral surface of the magnet holding ring 21. Of the entire surface of the permanent magnet 22, a surface that faces the inner peripheral surface of the cylindrical part 11 of the rotor 10 is the N pole. Of the entire surface of the permanent magnet 22, a surface that faces the outer peripheral surface of the magnet holding ring 21 is the S pole. Of the entire surface of the permanent magnet 23, a surface that faces the inner peripheral surface of the cylindrical part 11 of the rotor 10 is the S pole. Of the entire surface of the permanent magnet 23, a surface that faces the outer peripheral surface of the magnet holding ring 21 is the N pole. The plurality of pole pieces 24 are disposed above the plurality of permanent magnets 22 and 23, and are arranged in a circumferential direction of the stator 20. The plurality of pole pieces 24 are arranged between the plurality of permanent magnets 22 and 23 and the inner peripheral surface of the cylindrical part 11.

[Regarding Braking and Non-Braking Operation of Eddy Current Deceleration Device 1]

Referring to FIG. 3, at a time of non-braking operation, when viewed in the radial direction of the eddy current deceleration device 1, each of the permanent magnets 22 and each of the permanent magnets 23 overlaps with two of the pole pieces 24 that are adjacent to each other. In other words, when viewed in the radial direction of the eddy current deceleration device 1, one pole piece 24 overlaps with permanent magnets 22 and 23 that are adjacent to each other. In this case, as illustrated in FIG. 3, a magnetic flux B flows through the inside of the stator 20. Specifically, the magnetic flux B flows among the permanent magnets 22 and 23, the pole piece 24, and the magnet holding ring 21. Therefore, a magnetic circuit is not formed between the rotor 10 and the permanent magnets 22 and 23, and a Lorentz force is not generated in the rotor 10. Consequently, in the state illustrated in FIG. 3, a braking force does not act.

Figure 4:
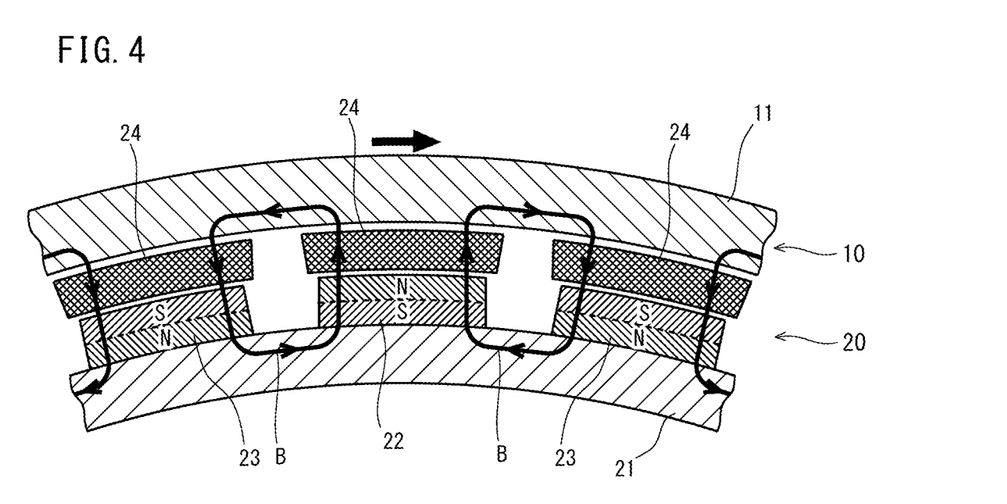
FIG. 4 is a cross-sectional view perpendicular to the axial direction (cross-sectional view in the radial direction) of the eddy current deceleration device during braking.

FIG. 4 is a cross-sectional view perpendicular to the axial direction (cross-sectional view in the radial direction) of the eddy current deceleration device 1 at the time of a braking operation. At the time of a braking operation, the magnet holding ring 21 in the stator 20 rotates to shift the relative positions of the permanent magnets 22 and 23 with respect to the pole pieces 24 in comparison to the state illustrated in FIG. 3. Specifically, in FIG. 4, at a time of a braking operation, when viewed in the radial direction of the eddy current deceleration device 1, each permanent magnet 22 or 23 overlaps with only one of the pole pieces 24, and does not overlap with two of the pole pieces 24. In this case, as illustrated in FIG. 4, the magnetic flux B flows among the magnet holding ring 21, the permanent magnet 22 or 23, the pole piece 24, and the cylindrical part 11. Therefore, a magnetic circuit is formed between the rotor 10 and the permanent magnet 22 or 23. At this time, an eddy current is generated in the cylindrical part 11 of the rotor 10. A Lorentz force is generated accompanying generation of the eddy current. The Lorentz force acts as a braking torque, and a braking force arises.

As described above, the eddy current deceleration device 1 generates a braking force by means of an eddy current that is generated in the rotor 10. Therefore, it is preferable that the amount of eddy current generated in the cylindrical part 11 of the rotor 10 is large. This is because the braking force will be large. The smaller the electrical resistance of the cylindrical part 11 is, the greater the generated amount of eddy current will be. Therefore, it is preferable that the electrical resistance is small in the cylindrical part 11 of the rotor 10. The rotor 10 is also subjected to a heat cycle by repetition of braking and non-braking. As mentioned above, recently there has been a demand to obtain high high-temperature strength even at 650° C. The rotor 10 is described in detail hereunder.

[Regarding Rotor 10 for an Eddy Current Deceleration Device]

[Chemical Composition]

The chemical composition of the cylindrical part 11 of the rotor 10 for an eddy current deceleration device of the present embodiment contains the following elements. The symbol "%" in relation to an element means "mass %" unless specifically stated otherwise.

[Regarding Essential Elements]

C: 0.05 to 0.15%

Carbon (C) increases the hardenability of the steel material that constitutes the rotor, and increases the strength of the steel material. In addition, C forms fine carbides such as Nb carbides and V carbides, and increases the high-temperature strength of the steel material. Furthermore, C forms Mo carbides and cementite (medium-sized carbides) having an equivalent circular diameter of 100 to 500 nm, and thereby increases the high-temperature strength of the steel material. If the content of C is less than 0.05%, even when the contents of the other elements are within the ranges of the present embodiment, the aforementioned effects will not be sufficiently obtained. On the other hand, if the content of C is more than 0.15%, even when the contents of the other elements are within the ranges of the present embodiment, the electrical resistance of the steel material will excessively increase. In this case, during braking of the eddy current deceleration device 1, the eddy current amount flowing through the cylindrical part 11 of the rotor 10 will decrease. As a result, the braking force of the eddy current deceleration device 1 will decrease. Therefore, the content of C is within the range of 0.05 to 0.15%. A preferable lower limit of the content of C is 0.06%, more preferably is 0.07%, and further preferably is 0.08%. A preferable upper limit of the content of C is 0.14%, more preferably is 0.13%, and further preferably is 0.12%.

Si: 0.10 to 0.40%

Silicon (Si) deoxidizes the steel in a steel making process. In addition, Si increases the hardenability of the steel material, and increases the strength of the steel material. If the content of Si is less than 0.10%, even when the contents of the other elements are within the ranges of the present embodiment, the aforementioned effects will not be sufficiently obtained. On the other hand, if the content of Si is more than 0.40%, even when the contents of the other elements are within the ranges of the present embodiment, the electrical resistance of the steel material will excessively increase. In this case, at a time of braking of the eddy current deceleration device 1, the eddy current amount flowing through the cylindrical part 11 of the rotor 10 will decrease. As a result, the braking force of the eddy current deceleration device 1 will decrease. Therefore, the content of Si is within the range of 0.10 to 0.40%. A preferable lower limit of the content of Si is 0.12%, more preferably is 0.15%, and further preferably is 0.17%. A preferable upper limit of the content of Si is 0.38%, more preferably is 0.36%, further preferably is 0.34%, further preferably is 0.32%, further preferably is 0.30%, further preferably is 0.28%, and further preferably is 0.26%.

Mn: 0.50 to 1.00%

Manganese (Mn) deoxidizes the steel in the steel making process. In addition, Mn increases the hardenability of the steel material, and increases the strength of the steel material. If the content of Mn is less than 0.50%, even when the contents of the other elements are within the ranges of the present embodiment, the aforementioned effects will not be sufficiently obtained. On the other hand, if the content of Mn is more than 1.00%, even when the contents of the other elements are within the ranges of the present embodiment, the electrical resistance of the steel material will excessively increase. In this case, at a time of braking of the eddy current deceleration device 1, the eddy current amount flowing through the cylindrical part 11 of the rotor 10 will decrease. As a result, the braking force of the eddy current deceleration device 1 will decrease. Therefore, the content of Mn is within the range of 0.50 to 1.00%. A preferable lower limit of the content of Mn is 0.56%, more preferably is 0.58%, further preferably is 0.60%, further preferably is 0.62%, further preferably is 0.64%, further preferably is 0.66%, and further preferably is 0.68%. A preferable upper limit of the content of Mn is 0.94%, more preferably is 0.90%, and further preferably is 0.88%.

P: 0.030% or less

Phosphorus (P) is an impurity that is unavoidably contained. In other words, the content of P is more than 0%. P reduces the hot workability and toughness of the steel material. P also increases the electrical resistance of the steel material. In this case, at a time of braking of the eddy current deceleration device 1, the eddy current amount flowing through the cylindrical part 11 of the rotor 10 will decrease. As a result, the braking force of the eddy current deceleration device 1 will decrease. If the content of P is more than 0.030%, even when the contents of the other elements are within the ranges of the present embodiment, the hot workability and toughness of the steel material will markedly decrease, and the braking force of the eddy current deceleration device 1 will also decrease. Therefore, the content of P is 0.030% or less. A preferable upper limit of the content of P is 0.028%, more preferably is 0.026%, and further preferably is 0.025%. The content of P is preferably as low as possible. However, excessively reducing the content of P will raise the production cost. Therefore, when taking into consideration normal industrial production, a preferable lower limit of the content of P is 0.001%, and more preferably is 0.003%.

S: 0.030% or less

Sulfur (S) is an impurity that is unavoidably contained. In other words, the content of S is more than 0%. S reduces the hot workability and toughness of the steel material. If the content of S is more than 0.030%, even when the contents of the other elements are within the ranges of the present embodiment, the hot workability and toughness of the steel material will markedly decrease. Therefore, the content of S is 0.030% or less. A preferable upper limit of the content of S is 0.025%, more preferably is 0.022%, and further preferably is 0.020%. The content of S is preferably as low as possible. However, excessively reducing the content of S will raise the production cost. Therefore, when taking into consideration normal industrial production, a preferable lower limit of the content of S is 0.001%, and more preferably is 0.002%.

Mo: 0.20 to 1.00%

Molybdenum (Mo) combines with C to form Mo carbides ($Mo_2C$). On the condition that precipitates having an equivalent circular diameter within a range of 100 to 500 nm including Mo carbides is within the range of 0.35 to 0.75 particles/$\mu m^2$, the high-temperature strength of the steel material increases. Mo also increases the hardenability of the steel material. In addition, Mo increases the toughness of the steel material. If the content of Mo is less than 0.20%, even when the contents of the other elements are within the ranges of the present embodiment, the aforementioned effects will not be sufficiently obtained. On the other hand, if the content of Mo is more than 1.00%, even when the contents of the other elements are within the ranges of the present embodiment, the electrical resistance of the steel material will excessively increase. In this case, during braking of the eddy current deceleration device 1, the eddy current amount flowing through the cylindrical part 11 of the rotor 10 will decrease. As a result, the braking force of the eddy current deceleration device 1 will decrease. Therefore, the content of Mo is within the range of 0.20 to 1.00%. A preferable lower limit of the content of Mo is 0.25%, more preferably is 0.30%, further preferably is 0.35%, and further preferably is 0.40%. A preferable upper limit of the content of Mo is 0.90%, more preferably is 0.80%, further preferably is 0.70%, and further preferably is 0.60%.

Nb: 0.020 to 0.060%

Niobium (Nb) combines with carbon to form Nb carbides (fine carbides), and increases the high-temperature strength of the steel material by precipitation strengthening. In addition, Nb suppresses coarsening of the grains. If the content of Nb is less than 0.020%, even when the contents of the other elements are within the ranges of the present embodiment, the aforementioned effects will not be sufficiently obtained. On the other hand, if the content of Nb is more than 0.060%, even when the contents of the other elements are within the ranges of the present embodiment, the electrical resistance of the steel material will excessively increase. In this case, during braking of the eddy current deceleration device 1, the eddy current amount flowing through the cylindrical part 11 of the rotor 10 will decrease. As a result, the braking force of the eddy current deceleration device 1 will decrease. Furthermore, if the content of Nb is more than 0.060%, the toughness of the steel material will also decrease. Therefore, the content of Nb is within the range of 0.020 to 0.060%. A preferable lower limit of the content of Nb is 0.025%, more preferably is 0.030%, further preferably is 0.032%, and further preferably is 0.034%. A preferable upper limit of the content of Nb is 0.058%, more preferably is 0.056%, further preferably is 0.054%, and further preferably is 0.052%.

V: 0.040 to 0.080%

Vanadium (V) combines with carbon to form V carbides (fine carbides), and increases the high-temperature strength of the steel material by precipitation strengthening. In addition, V suppresses coarsening of the grains. If the content of V is less than 0.040%, even when the contents of the other elements are within the ranges of the present embodiment, the aforementioned effects will not be sufficiently obtained. On the other hand, if the content of V is more than 0.080%, even when the contents of the other elements are within the ranges of the present embodiment, the electrical resistance of the steel material will excessively increase. In this case, during braking of the eddy current deceleration device 1, the eddy current amount flowing through the cylindrical part 11 of the rotor 10 will decrease. As a result, the braking force of the eddy current deceleration device 1 will decrease. Furthermore, if the content of V is more than 0.080%, the toughness of the steel material will also decrease. Therefore, the content of V is within the range of 0.040 to 0.080%. A preferable lower limit of the content of V is 0.044%, more preferably is 0.048%, and further preferably is 0.050%. A preferable upper limit of the content of V is 0.075%, more preferably is 0.070%, further preferably is 0.068%, further preferably is 0.066%, further preferably is 0.064%, and further preferably is 0.062%.

Sol. Al: 0.030 to 0.100%

Aluminum (Al) deoxidizes the steel in the steel making process. In addition, Al combines with nitrogen (N) to form AlN, and refines the grains of the steel material. If the content of sol. Al is less than 0.030%, even when the contents of the other elements are within the ranges of the present embodiment, the aforementioned effects will not be sufficiently obtained. On the other hand, if the content of sol. Al is more than 0.100%, even when the contents of the other elements are within the ranges of the present embodiment, the electrical resistance of the steel material will excessively increase. In this case, during braking of the eddy current deceleration device 1, the eddy current amount flowing through the cylindrical part 11 of the rotor 10 will decrease. As a result, the braking force of the eddy current deceleration device 1 will decrease. Therefore, the content of sol. Al is within the range of 0.030 to 0.100%. A preferable lower limit of the content of sol. Al is 0.040%, more preferably is 0.050%, and further preferably is 0.052%. A preferable upper limit of the content of sol. Al is 0.090%, more preferably is 0.088%, further preferably is 0.086%, further preferably is 0.084%, further preferably is 0.082%, and further preferably is 0.080%.

B: 0.0005 to 0.0050%

Boron (B) increases the hardenability of the steel material, and increases the high-temperature strength of the steel material. If the content of B is less than 0.0005%, even when the contents of the other elements are within the ranges of the present embodiment, the aforementioned effects will not be sufficiently obtained. On the other hand, if the content of B is more than 0.0050%, even when the contents of the other elements are within the ranges of the present embodiment, the toughness of the steel material will decrease. Therefore, the content of B is within the range of 0.0005 to 0.0050%. A preferable lower limit of the content of B is 0.0008%, more preferably is 0.0010%, further preferably is 0.0012%, further preferably is 0.0014%, and further preferably is 0.0015%. A preferable upper limit of the content of B is 0.0045%, more preferably is 0.0040%, further preferably is 0.0035%, and further preferably is 0.0030%.

N: 0.003 to 0.010%

Nitrogen (N) combines with Al to form AlN. AlN increases the high-temperature strength of the steel material by precipitation strengthening. AlN also refines the grains of the steel material. If the content of N is less than 0.003%, even when the contents of the other elements are within the ranges of the present embodiment, the aforementioned effects will not be sufficiently obtained. On the other hand, if the content of N is more than 0.010%, even when the contents of the other elements are within the ranges of the present embodiment, the electrical resistance of the steel material will excessively increase. In this case, during braking of the eddy current deceleration device 1, the eddy current amount flowing through the cylindrical part 11 of the rotor 10 will decrease. As a result, the braking force of the eddy current deceleration device 1 will decrease. Therefore, the content of N is within the range of 0.003 to 0.010%. A preferable lower limit of the content of N is 0.004%. A preferable upper limit of the content of N is 0.009%, more preferably is 0.008%, further preferably is 0.007%, and further preferably is 0.006%.

The balance in the chemical composition of the cylindrical part 11 of the rotor 10 of the eddy current deceleration device 1 of the present embodiment is Fe and impurities. Here, the term "impurities" refers to elements which, during industrial production of the cylindrical part 11 of the rotor 10 of the present embodiment, are mixed in from ore or scrap that is used as a raw material, or from the production environment or the like, and which are allowed within a range that does not adversely affect the cylindrical part 11 of the rotor 10 of the present embodiment.

[Regarding Optional Elements]

The chemical composition of the cylindrical part 11 of the rotor 10 of the eddy current deceleration device 1 of the present embodiment may also contain one or more elements selected from the group consisting of Cu, Ni, and Cr in lieu of a part of Fe. Each of these elements is an optional element, and increases the hardenability of the steel material.

Cu: 0 to 0.20%

Copper (Cu) is an optional element, and need not be contained. In other words, the content of Cu may be 0%. When contained, Cu increases the hardenability of the steel material, and increases the high-temperature strength of the steel material. If even a small amount of Cu is contained, the aforementioned effects will be obtained to a certain extent. However, if the content of Cu is more than 0.20%, even when the contents of the other elements are within the ranges of the present embodiment, the electrical resistance of the steel material will excessively increase. In this case, during braking of the eddy current deceleration device, the eddy current amount flowing through the cylindrical part 11 of the rotor 10 of the eddy current deceleration device 1 will decrease. As a result, the braking force of the eddy current deceleration device 1 will decrease. Therefore, the content of Cu is within the range of 0 to 0.20%. A preferable lower limit of the content of Cu is more than 0%, more preferably is 0.01%, and further preferably is 0.02%. A preferable upper limit of the content of Cu is 0.15%, more preferably is 0.12%, and further preferably is 0.10%.

Ni: 0 to 0.20%

Nickel (Ni) is an optional element, and need not be contained. In other words, the content of Ni may be 0%. When contained, Ni increases the hardenability of the steel material, and increases the high-temperature strength of the steel material. If even a small amount of Ni is contained, the aforementioned effects will be obtained to a certain extent. However, if the content of Ni is more than 0.20%, even when the contents of the other elements are within the ranges of the present embodiment, the electrical resistance of the steel material will excessively increase. In this case, during braking of the eddy current deceleration device 1, the eddy current amount flowing through the cylindrical part 11 of the rotor 10 of the eddy current deceleration device 1 will decrease. As a result, the braking force of the eddy current deceleration device 1 will decrease. Therefore, the content of Ni is within the range of 0 to 0.20%. A preferable lower limit of the content of Ni is more than 0%, more preferably is 0.01%, further preferably is 0.02%, and further preferably is 0.03%. A preferable upper limit of the content of Ni is 0.15%, more preferably is 0.12%, and further preferably is 0.10%.

Cr: 0 to 0.10%

Chromium (Cr) is an optional element, and need not be contained. In other words, the content of Cr may be 0%. When contained, Cr increases the hardenability of the steel material, and increases the high-temperature strength of the steel material. If even a small amount of Cr is contained, the aforementioned effects will be obtained to a certain extent. However, if the content of Cr is more than 0.10%, even when the contents of the other elements are within the ranges of the present embodiment, the electrical resistance of the steel material will excessively increase. In this case, during braking of the eddy current deceleration device 1, the eddy current amount flowing through the cylindrical part 11 of the rotor 10 of the eddy current deceleration device 1 will decrease. As a result, the braking force of the eddy current deceleration device 1 will decrease. Therefore, the content of Cr is within the range of 0 to 0.10%. A preferable lower limit of the content of Cr is more than 0%, more preferably is 0.01%, and further preferably is 0.02%. A preferable upper limit of the content of Ni is 0.09%, more preferably is 0.08%, further preferably is 0.07%, further preferably is 0.06%, and further preferably is 0.05%.

[Regarding Microstructure]

In the microstructure of the cylindrical part 11 of the rotor 10 of the present embodiment, the total area fraction of martensite and bainite is more than 95.0%. In other words, the microstructure of the cylindrical part 11 of the rotor 10 for an eddy current deceleration device of the present embodiment is a structure that is mainly composed of martensite and/or bainite. The term "martensite and bainite" as used in the present description also includes tempered martensite and tempered bainite. In the microstructure of the cylindrical part 11 of the rotor 10 of the present embodiment, the balance other than martensite and bainite is ferrite. In other words, the area fraction of ferrite is less than 5.0%.

Note that, apart from martensite, bainite, and ferrite, precipitates as typified by the aforementioned carbides, and inclusions are also present in the microstructure of the cylindrical part 11. However, the total area fraction of these precipitates and inclusions is extremely small compared to the area fractions of martensite, bainite and ferrite, and can be ignored.

Further, in microstructure observation to be described later, it is very difficult to distinguish between martensite and bainite. On the other hand, ferrite can be distinguished very easily from martensite and bainite by contrast. Therefore, in the microstructure observation, a region other than ferrite is recognized as "martensite and bainite".

The microstructure of the cylindrical part 11 of the rotor 10 for an eddy current deceleration device of the present embodiment also influences strength. In the microstructure of the cylindrical part 11 of the rotor 10 for an eddy current deceleration device of the present embodiment, if the total area fraction of martensite and bainite is 95.0% or less and the area fraction of ferrite is 5.0% or more, even if the number density of medium-sized carbides is within the range of 0.35 to 0.75 particles/$\mu m^2$, sufficient high-temperature strength will not be obtained. On the other hand, if the total area fraction of martensite and bainite is more than 95.0% and the area fraction of ferrite is less than 5.0%, on the premise that the contents of the respective elements in the chemical composition are within the corresponding ranges of the present embodiment and the number density of medium-sized carbides is within the range of 0.35 to 0.75 particles/$\mu m^2$, high high-temperature strength will be obtained at 650° C.

Here, the total area fraction of martensite and bainite, and the area fraction of ferrite in the microstructure can be measured by the following method. A sample is taken from the center position of the wall thickness of the cylindrical part 11 of the rotor 10. The size of the sample is not particularly limited as long as an observation visual field (200 μm×100 μm), described later, can be secured. Of the entire surface of the sample, an observation surface that includes the aforementioned observation visual field is mirror-polished. The sample after mirror-polishing is subjected to etching by immersion for around 10 seconds in a Nital solution, to reveal the microstructure at the observation surface. An arbitrary one visual field (observation visual field) within the observation surface where the structure was revealed by etching is observed using an optical microscope with a magnification of 500 times. The visual field area of the observation visual field is set to 20,000 $\mu m^2$ (200 μm×100 μm). As mentioned above, in the observation visual field, ferrite can be easily distinguished from martensite and bainite based on contrast. Therefore, the ferrite in the observation visual field is identified, and the area of the identified ferrite is determined. The area fraction (%) of ferrite is then determined by dividing the area of ferrite by the total area of the observation visual field. As mentioned above, in the microstructure of the cylindrical part 11 of the rotor 10 of the present embodiment, the balance other than ferrite is martensite and/or bainite. Thus, the total area fraction (%) of martensite and bainite is determined by the following equation.

Total area fraction of martensite and bainite=100.0− area fraction of ferrite

[Number Density of Carbides (Medium-Sized Carbides) Having Equivalent Circular Diameter of 100 to 500 nm]

In the cylindrical part 11 of the rotor 10 of the present embodiment, in addition, the number density of carbides (medium-sized carbides) having an equivalent circular diameter of 100 to 500 nm is within the range of 0.35 to 0.75 particles/$\mu m^2$. If the number density of medium-sized carbides is less than 0.35 particles/$\mu m^2$, even if the contents of the respective elements in the chemical composition are within the corresponding ranges of the present embodiment and, in the microstructure, the total area fraction of martensite and bainite is more than 95.0% and the area fraction of ferrite is less than 5.0%, the number density of medium-sized carbides will be too low. Therefore, sufficient high-temperature strength will not be obtained. On the other hand, if the number density of medium-sized carbides is more than 0.75 particles/$\mu m^2$, even if the contents of the respective elements in the chemical composition are within the corresponding ranges of the present embodiment and, in the microstructure, the total area fraction of martensite and bainite is more than 95.0% and the area fraction of ferrite is less than 5.0%, the number density of medium-sized carbides will be too high. In this case, a large number of dislocations will be trapped in the medium-sized carbides, and the dislocation density will become excessively high. Therefore, even though high high-temperature strength will be obtained, a decrease in the high-temperature strength associated with the cumulative operating time of the eddy current deceleration device will be large.

If the number density of medium-sized carbides is within the range of 0.35 to 0.75 particles/$\mu m^2$, on the premise that the contents of the respective elements in the chemical composition are within the corresponding ranges of the present embodiment and, in the microstructure, the total area fraction of martensite and bainite is more than 95.0% and the area fraction of ferrite is less than 5.0%, the rotor of the present embodiment will have high high-temperature strength, and a decrease in the high-temperature strength associated with the cumulative operating time of the eddy current deceleration device can be sufficiently suppressed. Specifically, the tensile strength TS0 at 650° C. will be 250 MPa or more, and the tensile strength difference ΔTS at 650° C. between before and after a high-temperature aging test will be less than 50 MPa. Note that, fine carbides that have an equivalent circular diameter of 50 nm or less are extremely fine, and it is difficult to quantitatively measure the number density thereof. In addition, even when the cumulative operating time in a high-temperature region is long, there is very little change in the shape of fine carbides. Therefore, fine carbides have little influence with respect to suppressing a decrease in the high-temperature strength associated with the cumulative operating time.

A preferable lower limit of the number density of medium-sized carbides is 0.38 particles/$\mu m^2$, more preferably is 0.40 particles/$\mu m^2$, further preferably is 0.42 particles/$\mu m^2$, further preferably is 0.44 particles/$\mu m^2$, further preferably is 0.46 particles/$\mu m^2$, and further preferably is 0.48 particles/$\mu m^2$. A preferable upper limit of the number density of medium-sized carbides is 0.70 particles/$\mu m^2$, more preferably is 0.68 particles/$\mu m^2$, further preferably is 0.66 particles/μm$^2$, further preferably is 0.64 particles/μm$^2$, and further preferably is 0.62 particles/μm$^2$.

[Method for Measuring Number Density of Medium-Sized Carbides]

The number density of medium-sized carbides can be measured by the following method. A sample is taken from the center position of the wall thickness of the cylindrical part 11 of the rotor 10. Of the entire surface of the sample, a part of the surface corresponding to a cross section perpendicular to the central axis direction of the cylindrical part 11 is adopted as the observation surface. The observation surface of the sample is mirror-polished. The observation surface after mirror-polishing is subjected to etching with a Nital solution. An arbitrary five visual fields (the visual field area per visual field is 12 μm×9 μm) on the observation surface after etching are observed at a magnification of 10,000 times using a scanning electron microscope (SEM).

The equivalent circular diameter of each precipitate confirmed in the five visual fields is determined. The equivalent circular diameter can be determined by well-known image processing. Among the respective precipitates, precipitates having an equivalent circular diameter within the range of 100 to 500 nm can be regarded as Mo carbides and/or cementite in the steel material of the chemical composition of the present embodiment. Accordingly, precipitates having an equivalent circular diameter within the range of 100 to 500 nm are recognized as medium-sized carbides. The number density of the medium-sized carbides (particles/μm$^2$) is determined based on the number of identified medium-sized carbides (carbides having an equivalent circular diameter within the range of 100 to 500 nm) and the total area (540 μm$^2$) of the five visual fields.

[Method for Measuring Electrical Resistance]

The electrical resistance of the cylindrical part 11 of the rotor 10 can be determined by a measurement method conforming to JIS C 2526 (1994). Specifically, a test specimen including the center position of the wall thickness of the cylindrical part 11 of the rotor 10 is taken. The test specimen is taken as a standard test specimen of 3 mm×4 mm×60 mm. The electrical resistance (μΩcm) of the test specimen is determined at normal temperature (20±15° C.) by the double bridge method.

[Method for Measuring Tensile Strength at 650° C.]

The tensile strength (MPa) at 650° C. of the cylindrical part of the rotor for an eddy current deceleration device can be determined by a measurement method conforming to JIS G 0567 (2012). Specifically, a tensile test specimen is taken from the center position of the wall thickness of the cylindrical part 11 of the rotor 10. A length of a parallel portion of the tensile test specimen is set to 40 mm, a diameter of the parallel portion is set to 6 mm, and the parallel portion is set to be parallel to the central axis of the cylindrical part 11. The tensile test specimen is heated using a reheating furnace to make the temperature of the tensile test specimen 650° C. The holding time at 650° C. is set to 10 minutes. A tensile test is performed in the atmosphere on the tensile test specimen at 650° C., and a stress-strain curve is obtained. The tensile strength TS0 (MPa) is determined from the obtained stress-strain curve.

[Method for Measuring Tensile Strength Difference ΔTS at 650° C. Between Before and After High-Temperature Aging Test]

The tensile strength difference ΔTS can be determined by the following method. Specifically, similarly to the above method for measuring the tensile strength at 650° C., the tensile test specimen described above is taken from the center position of the wall thickness of the cylindrical part 11 of the rotor 10. A high-temperature aging test is performed using the obtained tensile test specimen. Specifically, the tensile test specimen is aged at 650° C. for 300 hours using a reheating furnace. The tensile test specimen at 650° C. after the aging is subjected to a tensile test in the atmosphere, and a stress-strain curve is obtained. The tensile strength TS1 (MPa) is determined from the obtained stress-strain curve. Using the determined tensile strengths TS0 and TS1, the tensile strength difference ΔTS (MPa) at 650° C. between before and after the high-temperature aging test is determined by the following equation.

ΔTS=TS0−TS1

As described above, in the cylindrical part 11 of the rotor 10 for an eddy current deceleration device of the present embodiment, the respective elements contained in the chemical composition are within the aforementioned ranges of the present embodiment, and in the microstructure, the total area fraction of martensite and bainite is more than 95.0%, and the number density of carbides (medium-sized carbides) having an equivalent circular diameter of 100 to 500 nm is within a range of 0.35 to 0.75 particles/μm$^2$. Therefore, the rotor 10 for an eddy current deceleration device of the present embodiment has low electrical resistance and high high-temperature strength, and can sufficiently suppress a decrease in the high-temperature strength associated with the cumulative operating time of the eddy current deceleration device. Specifically, the electrical resistance is 20.0 μΩcm or less, the tensile strength TS0 at 650° C. is 250 MPa or more, and the tensile strength difference ΔTS at 650° C. between before and after the high-temperature aging test that is described above is 50 MPa or less.

[Production Method]

One example of a method for producing the rotor 10 for an eddy current deceleration device of the present embodiment will now be described. The production method described hereunder is one example of a method for producing the rotor 10 for an eddy current deceleration device of the present embodiment. Therefore, the rotor 10 for an eddy current deceleration device having the configuration described above may be produced by another production method that is different from the production method described hereunder. However, the production method described hereunder is a preferable example of a method for producing the rotor 10 for an eddy current deceleration device of the present embodiment.

The method for producing the rotor 10 for an eddy current deceleration device of the present embodiment includes: a raw material preparation process of preparing a raw material of the cylindrical part 11 of the rotor 10 for an eddy current deceleration device; a hot forging and hot rolling process of performing hot forging and hot rolling on the prepared raw material to produce an intermediate product corresponding to the cylindrical part 11; a heat treatment process of subjecting the intermediate product to quenching and tempering; a machining process of cutting the inner peripheral surface and/or outer peripheral surface of the intermediate product to form the cylindrical part 11 and a plurality of fins 11F; and a rotor forming process of producing the rotor 10 for an eddy current deceleration device using the wheel part 13, the arm part 12 and the cylindrical part 11. Hereunder, each of these processes is described.

[Raw Material Preparation Process]

In the raw material preparation process, a raw material having a chemical composition in which the contents of the respective elements are within the ranges of the present embodiment is prepared. The raw material may be a raw material that is supplied from a third party. The raw material may also be produced. In the case of producing the raw material, for example, the raw material is produced by the following method.

A molten steel having a chemical composition in which the contents of the respective elements are within the ranges of the present embodiment is produced. The refining method is not particularly limited, and a well-known method may be used. For example, hot metal produced by a well-known method is subjected to refining (primary refining) using a converter. Molten steel tapped from the converter is subjected to a well-known secondary refining. In the secondary refining, alloying elements subjected to composition adjustment are added to thereby produce a molten steel having a chemical composition in which the contents of the respective elements are within the ranges of the present embodiment.

The molten steel produced by the aforementioned refining method is used to produce a raw material by a well-known casting process. For example, an ingot is produced by an ingot-making process using the molten steel. Alternatively, a bloom or a billet may be produced by a continuous casting process using the molten steel. After the produced bloom or ingot is heated to within a range of 1000 to 1300° C., hot working may be performed to produce a billet. The hot working is, for example, hot rolling, hot forging, or the like. The thus-produced billet (billet produced by continuous casting, or billet produced by subjecting a bloom or an ingot to hot working) is adopted as the raw material of the rotor 10 for an eddy current deceleration device.

[Hot Forging and Hot Rolling Process]

The raw material prepared in the raw material preparation process is subjected to hot forging and hot rolling to produce an intermediate product corresponding to the cylindrical part 11. First, the raw material is heated to 1000 to 1300° C. The raw material after heating is subjected to hot forging and formed to have predetermined dimensions. After hot forging, the raw material is also subjected to hot rolling to produce a cylindrical intermediate product.

[Heat Treatment Process]

The intermediate product produced by the hot forging and hot rolling process is subjected to a heat treatment process. Specifically, the intermediate product is subjected to quenching, and thereafter is subjected to tempering.

[Quenching]

First, the intermediate product is subjected to quenching. The quenching temperature is within the range of 860 to 930° C. If the quenching temperature is less than 860° C., Mo carbides and cementite formed in the hot forging process will not sufficiently dissolve. In such a case, in the tempering in the next process, undissolved Mo carbides and cementite that remain in the intermediate product after quenching will coarsen. As a result, the number density of medium-sized carbides will decrease. Further, if the quenching temperature is less than 860° C., the microstructure of the intermediate product that is held at the quenching temperature will not become single-phase austenite. Therefore, ferrite, and not just martensite and/or bainite will remain in the structure after quenching. The upper limit of the quenching temperature is not particularly limited, and for example is 930° C. Therefore, the quenching temperature is within the range of 860 to 930° C. A preferable lower limit of the quenching temperature is 865° C., and further preferably is 870° C. If the quenching temperature is too high, the austenite will become coarse-grained. Therefore, a preferable upper limit of the quenching temperature is 920° C., and more preferably is 910° C.

The holding time at the aforementioned quenching temperature during quenching is not particularly limited, and for example, is within the range of 1.0 to 2.0 hours.

[Tempering]

The intermediate product after quenching is subjected to tempering. Fine carbides and medium-sized carbides are formed by the tempering. A tempering temperature T is from 660 to 700° C. If the tempering temperature T is less than 660° C., the number density of medium-sized carbides will be less than 0.35 particles/µm². In this case, because the precipitated amount of fine carbides and medium-sized carbides is insufficient, the high-temperature strength will decrease. On the other hand, if the tempering temperature T is more than 700° C., medium-sized carbides will coarsen and the number density of the medium-sized carbides will be less than 0.35 particles/µm². Consequently, the high-temperature strength will decrease. Furthermore, there is a possibility that a part of the microstructure will transform to austenite. Therefore, the tempering temperature T is within the range of 660 to 700° C. A preferable lower limit of the tempering temperature T is 670° C., and further preferably is 680° C.

The tempering also satisfies the following formula.

$$1400 \leq (T+273.15) \times (1+\log(t)) + (Mo/96+C/12) \times 20000 \leq 1800 \qquad (1)$$

Where, in Formula (1), the tempering temperature T (° C.) is substituted for "T", and the tempering holding time (hrs.) is substituted for "t". The content (mass %) of the corresponding element is substituted for each symbol of an element in Formula (1).

It is defined that $F1=(T+273.15)\times(1+\log(t))+(Mo/96+C/12)\times 20000$. F1 is an index of the precipitated amount of medium-sized carbides. If F1 is less than 1400, even if the tempering temperature is within the range of 660 to 700° C., medium-sized carbides will not be sufficiently formed, and the number density of the medium-sized carbides will be less than 0.35 particles/µm². On the other hand, if F1 is more than 1800, even if the tempering temperature is within the range of 660 to 700° C., an excessively large amount of medium-sized carbides will be formed, and the number density of the medium-sized carbides will be more than 0.75 particles/µm². As a result, a marked decrease will occur in the high-temperature strength associated with the cumulative operating time of the eddy current deceleration device.

If F1 is within the range of 1400 to 1800, the number density of medium-sized carbides will be within the range of 0.35 to 0.75 particles/µm². Therefore, excellent high-temperature strength will be obtained, and a marked decrease in the high-temperature strength associated with the cumulative operating time of the eddy current deceleration device can be sufficiently suppressed. A preferable lower limit of F1 is 1410, and further preferably is 1420. A preferable upper limit of F1 is 1790, more preferably is 1780, and further preferably is 1770.

[Machining Process]

The cooling fins 11F are formed by machining the outer peripheral surface of the intermediate product after tempering. A well-known method may be used to perform the machining. The cylindrical part 11 is produced by the above processes.

[Rotor Forming Process]

The arm part 12 attached to the wheel part 13 is attached to the thus-produced cylindrical part 11 to thereby produce the rotor 10 for an eddy current deceleration device. The attachment method may be welding or may be another method.

The rotor 10 for an eddy current deceleration device of the present embodiment can be produced by the production method described above. Note that, a method for producing the rotor 10 for an eddy current deceleration device of the present embodiment is not limited to the production method described above, and as long as the rotor 10 for an eddy current deceleration device that has the configuration described above can be produced, the rotor 10 for an eddy current deceleration device of the present embodiment may be produced by another production method that is different from the above production method. However, the above production method is a favorable example for producing the rotor 10 for an eddy current deceleration device of the present embodiment.

EXAMPLES

Molten steels having the chemical compositions shown in Table 1 were produced.

TABLE 1

| Test No. | Chemical Composition (unit is mass %; balance is Fe and impurities) | | | | | | | | | | | | | |
|---|---|---|---|---|---|---|---|---|---|---|---|---|---|---|
| | C | Si | Mn | P | S | Mo | Nb | V | sol.Al | B | N | Cu | Ni | Cr |
| 1 | 0.08 | 0.20 | 0.80 | 0.025 | 0.020 | 0.52 | 0.045 | 0.062 | 0.056 | 0.0023 | 0.004 | | | |
| 2 | 0.10 | 0.19 | 0.75 | 0.007 | 0.008 | 0.42 | 0.038 | 0.050 | 0.077 | 0.0015 | 0.005 | 0.08 | | |
| 3 | 0.09 | 0.25 | 0.62 | 0.012 | 0.012 | 0.55 | 0.052 | 0.053 | 0.060 | 0.0030 | 0.003 | | 0.06 | |
| 4 | 0.11 | 0.19 | 0.64 | 0.018 | 0.015 | 0.42 | 0.035 | 0.051 | 0.080 | 0.0020 | 0.006 | 0.05 | | 0.03 |
| 5 | 0.11 | 0.18 | 0.68 | 0.009 | 0.009 | 0.58 | 0.048 | 0.058 | 0.065 | 0.0027 | 0.004 | 0.03 | 0.05 | 0.02 |
| 6 | 0.09 | 0.18 | 0.77 | 0.019 | 0.018 | 0.49 | 0.045 | 0.062 | 0.060 | 0.0023 | 0.003 | | | |
| 7 | 0.08 | 0.20 | 0.80 | 0.023 | 0.020 | 0.48 | 0.048 | 0.055 | 0.056 | 0.0024 | 0.004 | | | |
| 8 | 0.09 | 0.23 | 0.88 | 0.019 | 0.003 | 0.13 | 0.038 | 0.055 | 0.068 | 0.0002 | 0.003 | | | |
| 9 | 0.03 | 0.21 | 0.65 | 0.023 | 0.001 | 0.60 | 0.050 | 0.056 | 0.070 | 0.0022 | 0.005 | 0.05 | | |
| 10 | 0.19 | 0.35 | 0.75 | 0.008 | 0.006 | 0.50 | 0.040 | 0.062 | 0.053 | 0.0018 | 0.006 | | | 0.13 |
| 11 | 0.08 | 0.20 | 0.80 | 0.025 | 0.020 | 0.52 | 0.045 | 0.062 | 0.056 | 0.0023 | 0.004 | | | |
| 12 | 0.08 | 0.20 | 0.80 | 0.025 | 0.020 | 0.52 | 0.045 | 0.062 | 0.056 | 0.0023 | 0.004 | | | |
| 13 | 0.08 | 0.20 | 0.80 | 0.025 | 0.020 | 0.52 | 0.045 | 0.062 | 0.056 | 0.0023 | 0.004 | | | |
| 14 | 0.08 | 0.20 | 0.80 | 0.025 | 0.020 | 0.52 | 0.045 | 0.062 | 0.056 | 0.0023 | 0.004 | | | |

A blank section in Table 1 means that the content of the corresponding element was less than the detection limit. For example, for the content of Cu of Test Number 1, the blank section means that the value rounded off to two decimal places was 0%. For the content of Ni of Test Number 1, the blank section means that the value rounded off to two decimal places was 0%. For the content of Cr of Test Number 1, the blank section means that the value rounded off to two decimal places was 0%. The respective molten steels were used to produce a 30-kg columnar ingot having a diameter of 120 mm by an ingot-making process.

After the ingot was heated to 1200° C., hot forging was performed to produce a steel sheet having a thickness of 40 mm as a pseudo intermediate product. The pseudo intermediate product was subjected to quenching at the quenching temperature listed in Table 2. The holding time at the quenching temperature was in the range of 1.1 to 1.7 hours. The pseudo intermediate product after quenching was subjected to tempering at the tempering temperature and F1 value listed in Table 2. By the above production process, a pseudo rotor (steel sheet) of each test number which simulated a rotor for an eddy current deceleration device was produced.

TABLE 2

| Test No. | Quenching Temperature (° C.) | Tempering Temperature (° C.) | F1 | Ferrite Area Fraction (%) | Total Area Fraction of Martensite and Bainite (%) | Medium-sized Carbides Number Density (particles/μm²) | Electrical Resistance (μΩcm) | Tensile Strength TS0 at 650° C. (MPa) | Tensile Strength TS1 after High-temperature aging test (MPa) | ΔTS (MPa) |
|---|---|---|---|---|---|---|---|---|---|---|
| 1 | 900 | 690 | 1495 | 1.9 | 98.1 | 0.54 | 19.8 | 290 | 248 | 42 |
| 2 | 890 | 680 | 1498 | 2.2 | 97.8 | 0.51 | 19.8 | 291 | 250 | 41 |
| 3 | 865 | 680 | 1523 | 1.5 | 98.5 | 0.62 | 19.7 | 295 | 247 | 48 |
| 4 | 870 | 690 | 1524 | 1.2 | 98.8 | 0.55 | 19.4 | 265 | 228 | 37 |
| 5 | 920 | 660 | 1433 | 0.8 | 99.2 | 0.49 | 19.7 | 290 | 243 | 47 |
| 6 | 900 | 700 | 1518 | 1.8 | 98.2 | 0.55 | 18.4 | 295 | 253 | 42 |
| 7 | 900 | 680 | 1760 | 1.7 | 98.3 | 0.66 | 18.8 | 290 | 250 | 40 |
| 8 | 900 | 690 | 1430 | 3.3 | 96.7 | 0.59 | 20.0 | 243 | 209 | 34 |
| 9 | 900 | 690 | 1430 | 2.2 | 97.8 | 0.61 | 19.6 | 229 | 199 | 30 |
| 10 | 900 | 690 | 1659 | 1.9 | 98.1 | 0.48 | 22.5 | 289 | 240 | 49 |
| 11 | 850 | 690 | 1495 | 7.9 | 92.1 | 0.41 | 19.8 | 218 | 184 | 34 |
| 12 | 900 | 710 | 1521 | 1.1 | 98.9 | 0.29 | 19.7 | 237 | 201 | 36 |
| 13 | 900 | 690 | 1374 | 0.9 | 99.1 | 0.18 | 19.8 | 235 | 199 | 36 |
| 14 | 900 | 690 | 2019 | 3.9 | 96.1 | 0.81 | 19.7 | 290 | 198 | 92 |

[Evaluation Tests]

The thus-produced pseudo rotor of each test number was subjected to the following evaluation tests.

A sample was taken from the center position of the sheet thickness of the pseudo rotor of each test number. The surface of the sample was mirror-polished, and thereafter the sample was immersed for around 10 seconds in a Nital solution to perform etching, thereby revealing the microstructure. An arbitrary one visual field (observation visual field) on the surface where the microstructure was revealed by etching was observed using an optical microscope with a magnification of 500 times. The visual field area of the observation visual field was 20,000 $\mu m^2$ (200 $\mu m \times 100$ $\mu m$). Phases in the observation visual field were identified by contrast. As a result, the microstructure in the observation visual field was composed of martensite and bainite, and ferrite. The area of the identified ferrite was determined. The area fraction (%) of ferrite was determined by dividing the area of ferrite by the total area of the observation visual field. As mentioned above, in the microstructure in the observation visual field, the balance other than ferrite was martensite and/or bainite. Therefore, the total area fraction (%) of martensite and bainite was determined by the following equation.

Total area fraction of martensite and bainite=100.0−area fraction of ferrite

The determined area fraction (%) of ferrite is shown in Table 2. The total area fraction (%) of martensite and bainite is shown in Table 2.

[Test for Measuring Number Density of Medium-Sized Carbides]

A sample was taken from the center position of the sheet thickness of the pseudo rotor of each test number. The observation surface of the sample was mirror-polished. The observation surface after mirror-polishing was subjected to etching with a Nital solution. A random five visual fields (visual field area per visual field was 12 $\mu m \times 9$ $\mu m$) on the observation surface after etching were observed at a magnification of 10,000 times using a scanning electron microscope (SEM). The equivalent circular diameter of each precipitate confirmed in the five visual fields was determined. Among the respective precipitates, since precipitates having an equivalent circular diameter within the range of 100 to 500 nm can be regarded as Mo carbides and/or cementite, the precipitates having an equivalent circular diameter within the range of 100 to 500 nm were recognized as medium-sized carbides. The number density of the medium-sized carbides (particles/$\mu m^2$) was determined based on the number of medium-sized carbides (carbides having an equivalent circular diameter of 100 to 500 nm) and the total area (540 $\mu m^2$) of the five visual fields. The obtained number density of medium-sized carbides is shown in Table 2.

[Electrical Resistance Measurement Method]

The electrical resistance at normal temperature of the pseudo rotor of each test number was determined by a measurement method conforming to JIS C 2526 (1994). Specifically, a test specimen was taken from the center position of the sheet thickness of the pseudo rotor of each test number. The size of the test specimen was 3 mm×4 mm×60 mm. The electrical resistance ($\mu\Omega$cm) of the test specimen was determined by the double bridge method at normal temperature. The obtained electrical resistance ($\mu\Omega$cm) is shown in Table 2.

[Tensile Test at 650° C.]

The tensile strength TS0 (MPa) at 650° C. of the pseudo rotor of each test number was determined by a measurement method conforming to JIS G 0567 (2012). Specifically, a tensile test specimen was taken from the center position of the sheet thickness of the pseudo rotor of each test number. The length of the parallel portion of the tensile test specimen was 40 mm, and the diameter of the parallel portion was 6 mm. The parallel portion of the tensile test specimen was parallel to the rolling direction of the pseudo rotor (steel sheet). The tensile test specimen was heated using a reheating furnace to make the temperature of the test specimen 650° C. The holding time at 650° C. was set to 10 minutes. A tensile test was performed in the atmosphere on the tensile test specimen at 650° C., and a stress-strain curve was obtained. The tensile strength TS0 (MPa) was determined from the obtained stress-strain curve. The obtained tensile strength TS0 (MPa) at 650° C. is shown in Table 2.

[Test for Measuring Tensile Strength Difference ΔTS at 650° C. Between Before and after High-Temperature Aging Test]

The tensile strength difference ΔTS of the pseudo rotor of each test number was determined by the following method. Similarly to the aforementioned tensile test at 650° C., a test specimen was taken from the center position of the sheet thickness of the pseudo rotor. The length of the parallel portion of the tensile test specimen was 40 mm, and the diameter of the parallel portion was 6 mm. The parallel portion of the tensile test specimen was parallel to the rolling direction of the pseudo rotor (steel sheet). The tensile test specimen was aged for 300 hours at 650° C. using a reheating furnace. A tensile test was performed in the atmosphere on the tensile test specimen at 650° C. after the aging, and a stress-strain curve was obtained. The tensile strength TS1 (MPa) was determined from the obtained stress-strain curve. Using the determined tensile strengths TS0 and TS1, the tensile strength difference ΔTS (MPa) at 650° C. between before and after the high-temperature aging test was determined by the following equation. The obtained tensile strength difference ΔTS is shown in Table 2.

ΔTS=TS0−TS1

[Test Results]

Referring to Table 2, in the pseudo rotors of Test Numbers 1 to 7, the content of each element in the chemical composition was appropriate, and the total area fraction of martensite and bainite was 95.0% or more. In addition, the number density of medium-sized carbides was within the range of 0.35 to 0.75 particles/$\mu m^2$. Therefore, the electrical resistance was 20.0 $\mu\Omega$cm or less, indicating sufficiently low electrical resistance as a rotor of an eddy current deceleration device. In addition, the tensile strength TS0 at 650° C. was 250 MPa or more in each of these pseudo rotors of Test Numbers 1 to 7, indicating excellent high-temperature strength. Furthermore, the tensile strength difference ΔTS was 50 MPa or less, and thus a decrease in the high-temperature strength after the high-temperature aging test was sufficiently suppressed.

On the other hand, in Test Number 8, the content of Mo and the content of B were too low. Therefore, the tensile strength TS0 at 650° C. was less than 250 MPa.

In Test Number 9, the content of C was too low. Therefore, the tensile strength TS0 at 650° C. was less than 250 MPa.

In Test Number 10, the content of C was too high. In addition, the content of Cr was too high. Therefore, the electrical resistance was too high.

In Test Number 11, although the content of each element was appropriate, the quenching temperature was too low. Therefore, the total area fraction of martensite and bainite was 95.0% or less. As a result, the tensile strength TS0 at 650° C. was less than 250 MPa.

In Test Number 12, although the content of each element was appropriate, the tempering temperature was too high. Therefore, the number density of medium-sized carbides was less than 0.35 particles/μm². As a result, the tensile strength TS0 at 650° C. was less than 250 MPa.

In Test Number 13, although the content of each element was appropriate, the F1 value was less than the lower limit of Formula (1). Therefore, the number density of medium-sized carbides was less than 0.35 particles/μm². As a result, the tensile strength TS0 at 650° C. was less than 250 MPa.

In Test Number 14, although the content of each element was appropriate, the F1 value was more than the upper limit of Formula (1). Therefore, the number density of medium-sized carbides was more than 0.75 particles/μm². As a result, the tensile strength difference ΔTS was more than 50 MPa.

An embodiment of the present invention has been described above. However, the foregoing embodiment is merely an example for implementing the present invention. Accordingly, the present invention is not limited to the above embodiment, and the above embodiment can be appropriately modified within a range that does not deviate from the gist of the present invention and implemented.

REFERENCE SIGNS LIST

1 Eddy current deceleration device
10 Rotor
11 Cylindrical part
12 Arm part
13 Wheel part
20 Stator

The invention claimed is:

1. A rotor for an eddy current deceleration device, comprising:
a cylindrical part,
wherein a chemical composition of the cylindrical part consists of, by mass %,
C: 0.05 to 0.15%,
Si: 0.10 to 0.40%,
Mn: 0.50 to 1.00%,
P: 0.030% or less,
S: 0.030% or less,
Mo: 0.20 to 1.00%,
Nb: 0.020 to 0.060%,
V: 0.040 to 0.080%,
sol. Al: 0.030 to 0.100%,
B: 0.0005 to 0.0050%,
N: 0.003 to 0.010%,
Cu: 0 to 0.20%,
Ni: 0 to 0.20%,
Cr: 0 to 0.10%, and
the balance: Fe and impurities,
and wherein:
a total area fraction of martensite and bainite in a microstructure is more than 95.0%, and
a number density of carbides having an equivalent circular diameter of 100 to 500 nm is within a range of 0.35 to 0.75 particles/μm².

2. The rotor for an eddy current deceleration device according to claim 1, wherein the chemical composition contains one or more elements selected from a group consisting of:
Cu: 0.01 to 0.20%,
Ni: 0.01 to 0.20%, and
Cr: 0.01 to 0.10%.

* * * * *